United States Patent

[11] 3,623,521

[72] Inventor Dean W. Shields
 Toledo, Ohio
[21] Appl. No. 45,314
[22] Filed June 11, 1970
[45] Patented Nov. 30, 1971
[73] Assignee Owens-Illinois, Inc.

[54] TREE HARVESTER
 9 Claims, 2 Drawing Figs.
[52] U.S. Cl. .................................................. 144/309 AC,
 144/3 D, 144/2 Z
[51] Int. Cl. ........................................................ A01g 23/02
[50] Field of Search .......................................... 144/2 Z, 3
 D, 34 R, 34 E, 309 AC

[56] References Cited
 UNITED STATES PATENTS
 2,161,734 6/1939 Wheless ........................ 144/3 D
 3,329,184 7/1967 Longert ......................... 144/3 D
 3,461,926 8/1969 Larson .......................... 144/2 Z
 3,531,235 9/1970 Boyd et al. .................... 144/3 D

*Primary Examiner*—Gerald A. Dost
*Attorneys*—Alan J. Steger and E. J. Holler

ABSTRACT: A novel and improved tree-harvesting method and apparatus adapted to cut, delimb, top, sort, transport, and deposit a plurality of trees in two sorted stacks at a desired collection point. The tree harvester features a horizontally oriented mast which is mounted on a mobile vehicle. A butt shear and felling grapple are mounted at one end of the mast and are adapted to grasp and sever a standing tree and pivot it to a substantially horizontal position overlying the mast where it is grasped and securely held by a transfer grapple. A combination delimber and top shear is mounted for longitudinal movement on the top of the mast and is adapted to be driven along the tree to strip all limbs from the tree and also to remove the top portion of the tree at either a predetermined length or diameter. After the tree has been delimbed and topped, it is dropped by the transfer grapple into one of two sets of collection arms positioned at intervals along opposite sides of the mast and adapted to hold a large number of delimbed, topped and sorted trees to be transported by the tree harvester to desired collection points where the trees are deposited in separate sorted stacks. The positioning of collection arms on opposite sides of the mast allows the operator to sort the delimbed and topped trees (e.g. according to length or type of wood) and drop them into the appropriate collection arms.

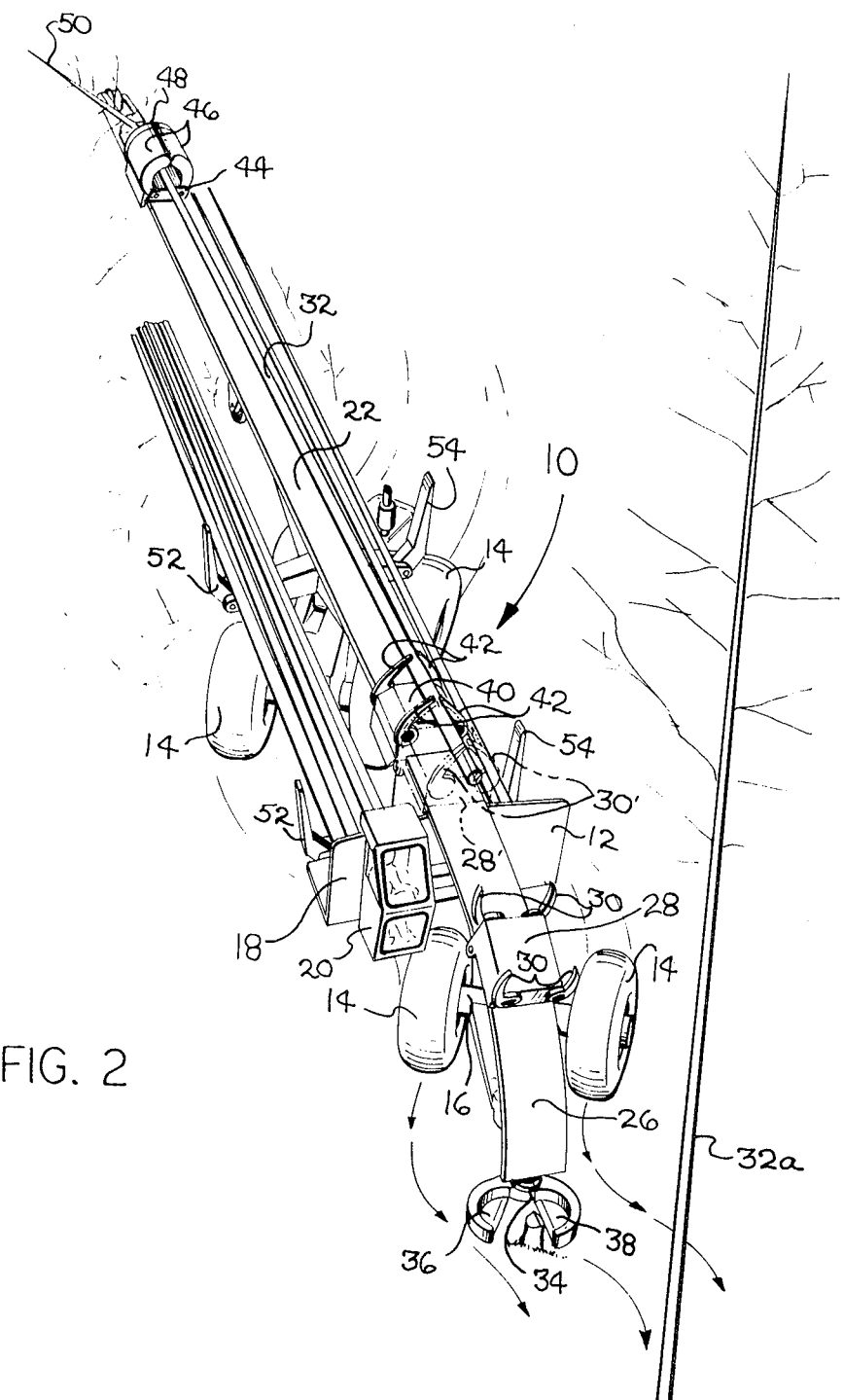

3,623,521

TREE HARVESTER

BACKGROUND OF THE INVENTION

This invention relates to a novel method and apparatus for harvesting and processing trees.

More specifically, this invention relates to an improved tree harvester of the type disclosed in copending U.S. Ser. No. 877,937 filed Nov. 19, 1969 and assigned to the same assignee as the subject invention.

Historically, trees have been harvested by methods requiring various sequences of operations and the use of a number of different tools, tractors, horses, saws, skidders, trucks, cranes and the like. More specifically, trees have been felled by using handsaws manually, manipulated power saws, axes, wedges and guide ropes. These procedures obviously require a considerable amount of manual labor. In order to reduce the amount and cost of the manual labor various machines have been proposed heretofore for felling trees, but such machines have not been found to be sufficiently practical for harvesting trees from a forest.

It is, therefore, an object of this invention to provide a novel tree-harvesting machine which completely processes a tree and overcomes the disadvantages associated with previously known tree-harvesting machinery.

SUMMARY OF THE INVENTION

This invention provides a unique tree-harvesting machine which will cut, delimb, top, sort, transport, and deposit a plurality of trees in separate sorted stacks at desired collection points.

In general, the tree-harvesting machine of this invention features a substantially horizontally extending mast which is mounted on a mobile vehicle. A butt shear and felling grapple are mounted at one end of the mast and are adapted to grasp and sever a standing tree and pivot it to a substantially horizontal position overlying the mast. A transfer grapple is mounted on the mast near the same end as the butt shear and felling grapple and is adapted to receive and securely hold the tree after it has been laid down by the felling grapple. The novel tree harvester of this invention further includes a combination delimber and top shear which is mounted for longitudinal movement on the top of the horizontal mast and is adapted to be driven along the tree to strip all limbs from the tree and to remove the top portion of the tree at either a predetermined length or predetermined diameter. Two separate tree-collection means are attached to opposite sides of the horizontal mast and are adapted to receive a large number of delimbed, topped and sorted trees to be transported by the tree harvester to a collection point where the trees can be dropped in separate sorted stacks. The positioning of collection arms on both sides of the mast allows the operator to sort the delimbed and topped trees (e.g. according to length or type of wood) and drop them into the appropriate collection arms.

Other objects, features and advantages of this invention will become obvious upon reference to the following detailed description of the invention and the drawings illustrating the preferred embodiment thereof.

IN THE DRAWINGS

FIG. 2 is a perspective view of the improved harvester of FIG. 1 after it has pivoted the first tree to a substantially horizontal position, delimbed and topped the first tree, and is approaching a second standing tree.

DETAILED DESCRIPTION OF THE INVENTION

Figure 1:
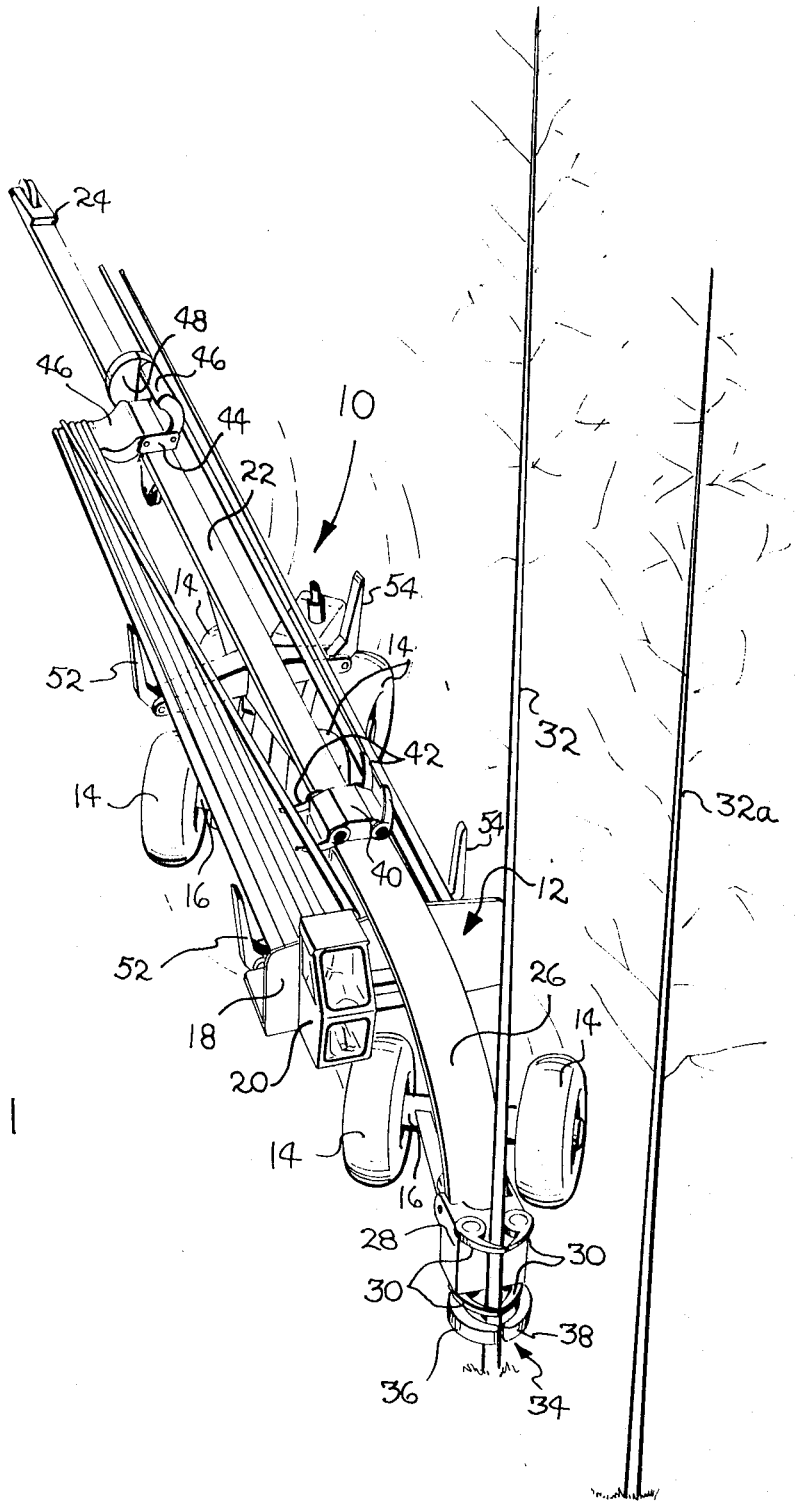
FIG. 1 is a perspective view of the improved tree harvester of this invention as it initially grasps and severs a first standing tree at ground level.

A novel and improved tree harvester is shown in FIGS. 1 and 2 and is indicated generally by the numeral 10. A mobile vehicle supporting and powering the tree-harvesting apparatus of this invention is indicated generally by the numeral 12 and may comprise any suitable mobile vehicle such as a tractor mounted on large rubber-tired wheels 14 which are connected by means of axles 16. Mounted on a front panel 18 of the mobile vehicle 12 is an operator cab 20 from which an operator can easily view the trees which are to be harvested and control the harvesting mechanisms of this machine. The mobile vehicle 12 may be of any suitable type which is adapted to support the tree-harvester apparatus and convey it into a forest type area. In addition, the mobile vehicle 12 includes power plant units (not shown) which are of standard types suitable to propel the vehicle 12 and provide power for operating various tree-harvesting apparatus which will be hereinafter described.

The main structural component of the tree-harvesting apparatus of this invention is a mast 22 which is mounted in a generally horizontal position on the mobile vehicle 12. The horizontal mast 22 includes a delimber head stopping member 24 at its rear end and a curved ramp surface 26 to accommodate felling grapple unit 28 at its front end.

The felling grapple unit 28 is mounted on the curved portion 26 of the mast 22 for rolling movement thereon. The felling grapple unit 28 includes four grasping arms 30 which as can be seen in FIG. 1 are adapted to securely hold and position the trunk of a standing tree, such as first standing tree 32. Mounted at the bottom of the curved portion of the mast 22 is a butt shear mechanism 34. The butt shear mechanism includes a movable shearing blade 36 and stationary shearing blade 38. The movable shearing blade 36 is hydraulically actuatable to pivot into shearing contact with fixed blade 38 to thereby sever the trunk of the tree positioned therebetween. Thus, as can be seen in FIG. 1, the four grasping arms 30 of the felling grapple unit 38 securely hold and position the trunk of first standing tree 32 while the cutting blades 36 and 38 of the butt shear 34 sever the tree 32 at a location close to the ground level. The felling grapple unit 28 is then actuatable to be driven along the curved portion 26 of the mast 22 to pivot the first standing tree 33 through 90° to a position parallel to and overlying the horizontal mast 22. The felling grapple unit 28 will be moved on the curved portion of the mast 22 by any suitable drive means (not shown) such as a hydraulic means or a mechanical cable drive means.

Fixed on the top of the mast 22 near the same end as the felling grapple unit 28 is a transfer grapple unit 40. The transfer grapple unit 40 includes four grasping arms 42 which are very similar to the grasping arms 30 on the felling grapple unit 28. It is the function of the grasping arms 42 on the transfer grapple 40 to securely hold and position the trees in an overlying position with respect to the mast 22 while the delimbing and topping functions are performed by apparatus to be described hereinafter. When the first standing tree 32 has been pivoted by means of the felling grapple unit 28 to the position shown in FIG. 2, (where the felling grapple 28' and its grasping arms 36' are shown in phantom lines) the grasping arms 42 of the transfer grapple 40 are closed to grasp and securely hold the tree 32. At this time, the grasping arms 30 may be opened and the felling grapple unit 28 driven downwardly along the curved portion 26 of the mast 22 (as shown in the solid lines in FIG. 2) in preparation for grasping and severing a second standing tree 32a.

A combination delimber and top shear unit 44 is mounted on and adapted for movement along the length of mast 22. The details and operation of this combination delimber and top shear unit 44 are identical to that unit disclosed in copending U.S. Ser. No. 877,937 filed Nov. 19, 1969 and assigned to the same assignee as the subject invention. In summary, this delimber unit 44 includes a pair of delimbing blades 46 which are spring biased into circumferential engagement with the tree. The delimbing blades 46 are adapted to strip branches from the tree 32 as the delimber unit 44 is moved axially along the tree. Actuating means are provided to open the delimbing blades prior to the acceptance of another tree to be processed. Also included in the delimber unit 44 is a top shear device 48 which comprises a pair of knife edge blades which are actuatable to shear through the tree trunk to thereby remove the top portion 50 of the tree 32. The top shear device 48 is adapted to be automatically actuated at either a predetermined length of the tree trunk or at a predetermined diameter. For example, if it is desired to have the tree cut at a predetermined length of 50 feet, the top shear mechanism 56 can be set to automatically shear off the top of the tree when it reaches a 50-foot length as it passes along the tree; or, if it is desired to have no portion of the resulting tree trunk with a diameter of less than 3 inches the top shear may be set to sense a diameter of 3 inches and automatically shear off the top of the trees at that point.

In summary, the operation of the delimber and top shear unit 44 is as follows. As the unit 44 proceeds back along mast 22 (FIG. 1) to a position adjacent to the transfer grapple 40 the delimbing blades 46 and the top shear device 48 are opened to receive the next tree to be processed. Once the standing tree 32 has been severed and pivoted by the felling grapple 28 to the position shown in FIG. 2, where it is held by the transfer grapple 40, the delimbing blades 46 are closed around the trunk of the tree and the delimber unit driven along the tree to thereby strip all branches from the tree. When the delimbing unit 44 reaches either a predetermined length of the tree or a predetermined diameter of the tree, such as the position shown in FIG. 2, the top shear mechanism is actuated to shear off the top portion 50 and the delimber unit 44 passes to a location beyond the now delimbed and topped tree 32.

It is, at this point, while the delimbed and topped tree 32 is held by the grasping arms 42 of the transfer grapple unit 40, when the improved concept of this invention becomes important. In accordance with the improved concept of this invention a plurality of collection arms 52 and 54 are provided on both sides of the mast 22 and adapted to hold for transfer with the tree-harvester 10 a number of processed trees. The pairs of collection arms 52 and 54 on opposite sides of the mast 22 are individually operable to pivot downwardly to simultaneously drop a bundle of processed trees at a predetermined collection point. Heretofore, tree harvesters of this type have contained only one set of collection arms so that all trees processed by the machine were dropped into this collection means for storage and transport with the machine. The improved apparatus of this invention includes two separate collection means 52 and 54 thereby affording the operator the opportunity to sort the processed trees according to their length or type of wood. The grasping arms 42 on the transfer grapple 40 are adapted to pivot downwardly to either side of the mast. Thus, the operator may selectively drop a processed tree into either of the collection means 52 or 54. For the purposes of illustration, the tree-harvester 10 of this invention has been drawn to show the collection means 52 holding trees of relatively short length while the collection means 54 is holding trees of longer length. As seen in FIG. 2, the tree 32 has been topped at a length corresponding to the longer tree being held by collection means 54 so that the operator would actuate the grasping arms 42 adjacent the collection means 54 to drop the tree 32 into the collection means 54. Similarly, if the tree 32 has been topped at a much shorter length the operator would actuate the opposite two grasping arms 42 adjacent to the collection means 52 to thereby drop the shorter length tree into the collection means 52. It should be noted also, that the selection made by the operator may be based on the type of wood contained in the individual tree being processed rather than on length or other size considerations. The collection arms 52 and 54 are individually actuatable to be pivoted downwardly to drop the bundle of processed trees contained therein at a predetermined collection point. Thus, the operator may individually drop all of the short trees, for example, contained in collection means 52 at a desired collection point while simultaneously keeping the long trees contained in collection means 54 for deposit at a later collection point.

Thus, the improved tree-harvesting concept of this invention provides a unique tree-harvesting machine which is capable of completely processing a plurality of trees and delivering them in two separate sorted groups to a predetermined collection point. Once the operator has directed the equipment to a given tree such that it has been grasped by the felling grapple unit 28 and severed by the butt shear device 34, the tree is then automatically pivoted to a substantially horizontal position where it is grasped and held above the mast 22 by the grasping arms 42 on the transfer grapple 40. The delimber blades 46 are then closed into contact with the tree 32 and the delimber unit 44 is driven along the mast 22 to remove all limbs from the tree 32. Once the delimber unit 44 reaches either a predetermined length or a predetermined diameter, as described previously, the top shear 48 removes the top portion 50 of the tree 32. The delimber unit 44 is then moved past the tree and the now delimbed and topped tree is releaseable by the arms 42 into either the collection means 52 on one side of the mast 22 or the collection means 54 on the other side of the mast 22 at the discretion of the operator. As discussed previously, the inclusion of two separate collection means 52 and 54 allows the operator to sort the processed trees according to their physical characteristics, such as length or type of wood. It should be noted that as soon as the tree 32 is grasped and held by the arms 42 on the transfer grapple 40, the felling grapple unit 28 is moved downwardly as shown in FIG. 2. Then, the operator may proceed to advance the harvester 10 so that the felling grapple unit 28 is positioned to grasp a second tree 32a while the first tree is being delimbed, topped and sorted. As soon as the first tree 32 has been released by the holding arms 42 into one of the two collection means 52 and 54, the second tree 32a will be sheared by the butt shear 34 and pivoted into position to be held by the arms 42 for delimbing, topping and sorting. Thus, while one tree is being processed, the operator may position the equipment to grasp and shear the next tree so that the harvesting process becomes a continuous one.

Therefore, it should be clear that a continuous tree harvester is provided by this invention which is adapted to completely process trees in an extremely fast and economical manner. Previously, such tree harvesters have been adapted to sever and delimb only one tree at a time prior to approaching a second tree. In addition, they were not equipped to stack and carry a number of processed trees for dumping in a bundle at a predetermined collection point. In other words, previous such harvesters would process one tree at a time and drop it individually on the ground for collection at a later time. This, therefore, required the use of a separate tree-gathering machine. In contracts to this, the novel tree harvester of this invention is capable of sorting into two groups on the machine a plurality of trees for transport with the machine and then dumping them in two separate sorted groups at predetermined collection points. Thus, this self-transporting feature of the subject invention eliminates the need for a tree-collection machine to be used for collecting individual trees deposited randomly throughout the forest. In addition, the machine of this invention eliminates the time and labor involved in sorting trees at the collection point.

In summation, the novel tree harvester of the subject invention requires the labor of only one operator to cut, delimb, top, sort and transport a group of trees for dumping in two sorted stacks at desired collection points. In contrast to this, previously known procedures would require several pieces of equipment and several operators to accomplish the same result. Thus, with the tree-harvesting apparatus and method of this invention considerable expense is saved both in machinery and labor over previously known tree-harvesting methods.

I claim:

1. Tree-harvesting apparatus comprising, in combination:
   a mobile vehicle;
   mast means mounted on said mobile vehicle and oriented in a substantially horizontal direction;
   butt shear means mounted on one end of said mast for severing a standing tree;

felling grapple means mounted on said one end of said mast means for grasping said standing tree while it is being severed by said butt shear means and for pivoting the standing tree to a substantially horizontal position overlying said mast means;

transfer grapple means fixed to said mast means adjacent said felling grapple means for receiving a tree from said felling grapple means, for securely holding the tree in a substantially horizontal position overlying said mast means, and for selectively releasing said tree on either side of said mast means;

delimbing and topping means mounted for axial movement on said mast means for stripping all branches from said tree and for removing the top of the tree;

and separate collection means attached to opposite sides of said mast means for receiving a number of similarly selected delimbed and topped trees selectively released by said transfer grapple means for transport with said tree-harvesting apparatus.

2. Tree-harvesting apparatus as set forth in claim 1 wherein each of said separate collection means attached to opposite sides of said mast means includes a plurality of pivotable collection arms adapted to receive and hold a number of similarly selected delimbed and topped trees selectively released by said transfer grapple means, and the pivotable arms comprising each of said separate collection means being adapted to simultaneously pivot downwardly to drop the collection of similarly selected trees carried thereon.

3. Tree-harvesting apparatus as set forth in claim 2 wherein said transfer grapple means includes holding arms mounted on opposite sides thereof and movable into and out of holding engagement with the tree pivoted into overlying relationship with said mast means by said felling grapple means, the individual holding arms on opposite sides of said transfer grapple means being pivotable downwardly to selectively release said tree on either side of said mast means.

4. Tree-harvesting apparatus as set forth in claim 3 wherein said mast means terminates at said one end in an arcuate ramp portion.

5. Tree-harvesting apparatus as set forth in claim 4 wherein said butt shear means is fixedly mounted on the lower end of said arcuate ramp portion of said mast means.

6. Tree-harvesting apparatus as set forth in claim 4 wherein felling grapple means is mounted for relative movement on said arcuate ramp portion of said mast means.

7. The method of harvesting trees comprising the steps of grasping a standing tree, severing the tree at a point near its base, pivoting the severed tree to a substantially horizontal orientation, supporting said tree in an elevated position while maintaining its substantially horizontal orientation, delimbing said tree while it is supported in a substantially horizontal position, topping said tree while it is supported in a substantially horizontal position, selectively sorting said tree for storage in one of two selective storage areas, and storing said sorted tree topped along with similarly sorted trees in an elevated and substantially horizontal position in one of said two selective storage areas.

8. The method of claim 7 further including the step of releasing said selectively stored trees from one of said two selective storage areas to thereby deposit said selectively sorted trees from said one storage area in a stack.

9. The method of claim 8 further including the step of releasing said selectively stored trees from the other of said two selective storage areas to thereby deposit said selectively sorted trees from said other storage area in a stack.

* * * * *